United States Patent [19]

Chai et al.

[11] Patent Number: 4,475,051
[45] Date of Patent: Oct. 2, 1984

[54] LOW INERTIA HIGH TORQUE VARIABLE RELUCTANCE MOTOR

[75] Inventors: Hi D. Chai, San Jose, Calif.; Joseph P. Pawletko, Endwell, N.Y.

[73] Assignee: International Business Machines Corporation, Armonk, N.Y.

[21] Appl. No.: 412,453

[22] Filed: Aug. 27, 1982

[51] Int. Cl.$^3$ .............................................. H02K 37/00
[52] U.S. Cl. ...................................... 310/49; 310/162; 310/190
[58] Field of Search ........................ 310/49, 190–193, 310/162–165

[56] References Cited

U.S. PATENT DOCUMENTS

| | | | |
|---|---|---|---|
| 3,344,325 | 9/1967 | Sklaroff | 310/496 |
| 3,465,225 | 9/1969 | O'Regan et al. | 310/49 |
| 3,875,437 | 4/1975 | Hara et al. | 310/49 |
| 3,984,711 | 10/1976 | Kordik | 310/49 R |
| 4,288,709 | 9/1981 | Matthias et al. | 310/49 |

OTHER PUBLICATIONS

Madsen, "Stepper Motors Convert Pulses to Accurate Mechanized Steps", 4/80, pp. 205–209.
Kozuchowski, "Stepping Motors", 5/79, pp. I–VIII.

Primary Examiner—Donovan F. Duggan
Attorney, Agent, or Firm—Jesse L. Abzug; J. Jancin, Jr.; Elmer W. Galbi

[57] ABSTRACT

A high performance, low cost variable reluctance stepper motor has an integral structure with a ring and a plurality of aligned salient pole members. A plurality of teeth are located on the face of each pole member. Windings are disposed on alternate ones of the pole members and a high impedance means isolates the pole members from one another. A rotor with a plurality of teeth and a plurality of holes disposed thereon coacts with the pole members and is moved in a step fashion by the sequential energization of the windings. The flux generated by the energization of the windings is confined to a short path and coupling to the remainder of the structure is negligible. Recesses positioned symetrically around the structure also serve to enhance flux splitting and reduce adjacent flux coupling.

9 Claims, 2 Drawing Figures

LOW INERTIA HIGH TORQUE VARIABLE RELUCTANCE MOTOR

DESCRIPTION

1. Technical Field

The invention relates to a variable reluctance stepper motor.

2. Background Art

Variable reluctance motors provide a path for magnetic flux analogous to the way electrical circuits provide paths for electrical currents. One known method of providing such a flux path is disclosed in U.S. Pat. No. 3,465,225 to O'Regan et al. This patent describes a stator with a plurality of inwardly directed poles and a rotor which coacts with the stator. Windings are disposed on alternate poles of the stator. The non-winding poles as well as the rotor, the periphery of the stator, and the winding poles create a path for the flux generated by the energization of the windings.

A very important factor in the operational efficiency of a high torque variable reluctance motor is the confinement of the magnetic flux. Techniques have been employed in an attempt to reduce the diversion of the flux between adjacent winding poles so that the torque of the motor is greater for a given amount of current applied to the windings. U.S. Pat. No. 3,984,711 to Kordik discloses the use of permanent magnets between the winding poles to accomplish this purpose. The flux produced by the magnets opposes the diversion of the flux created by the energization of the windings and confines this winding created flux to a more effective path.

Despite the increase in performance obtained by the use of magnets disposed between the winding poles, a less expensive and even higher performance technique is needed for variable reluctance stepper motors.

DISCLOSURE OF THE INVENTION

The motor apparatus of the present invention employs an integral pole member structure as a stator. This structure has a ring and a plurality of aligned salient pole members. A plurality of teeth are also disposed on the face of each pole member. Windings are located on alternate ones of the pole members and a high impedance means such as an air gap isolates the pole members from one another. A rotor with a plurality of teeth and a plurality of holes disposed thereon coacts with the pole members and serves as a variable reluctance member. The rotor is moved in step fashion relative to the stator by the sequential energization of the windings. In order to further enhance flux splitting and to reduce adjacent flux coupling the integral pole member structure may also have a plurality of inwardly projecting recesses disposed around its periphery. The recesses are positioned in the lateral center of a non-winding pole member and are not deep enough to completely pierce the ring and make contact with the non-winding pole member.

The present invention has several advantages over prior art variable reluctance stepper motors. The present invention provides for higher performance by reducing the inertia of the rotor while maintaining a large rotor diameter. This is accomplished by confining the flux generated by energizing the windings to a shorter magnetic path than prior motors. The present invention also reduces flux coupling between pole members on which windings are disposed. Thus the present invention increases the operational efficiency of a variable reluctance stepper motor by reducing the flux diversion. The present invention also provides for a variable reluctance stepper motor which produces higher torque for a given amount of winding current when compared to the prior art.

In addition, the present invention provides for a less expensive variable reluctance stepper motor. The present invention requires no permanent magnets as do some prior art motors. Not only does this elimination of permanent magnets do away with the costs attendant to the permanent magnets themselves, but it also does away with the costs and problems associated with attracting the permanent magnets to the stator. Furthermore, the stator of the present invention is an integral ring and pole member structure which can be manufactured as a single element.

BEST MODE FOR CARRYING OUT THE INVENTION

Figure 1:
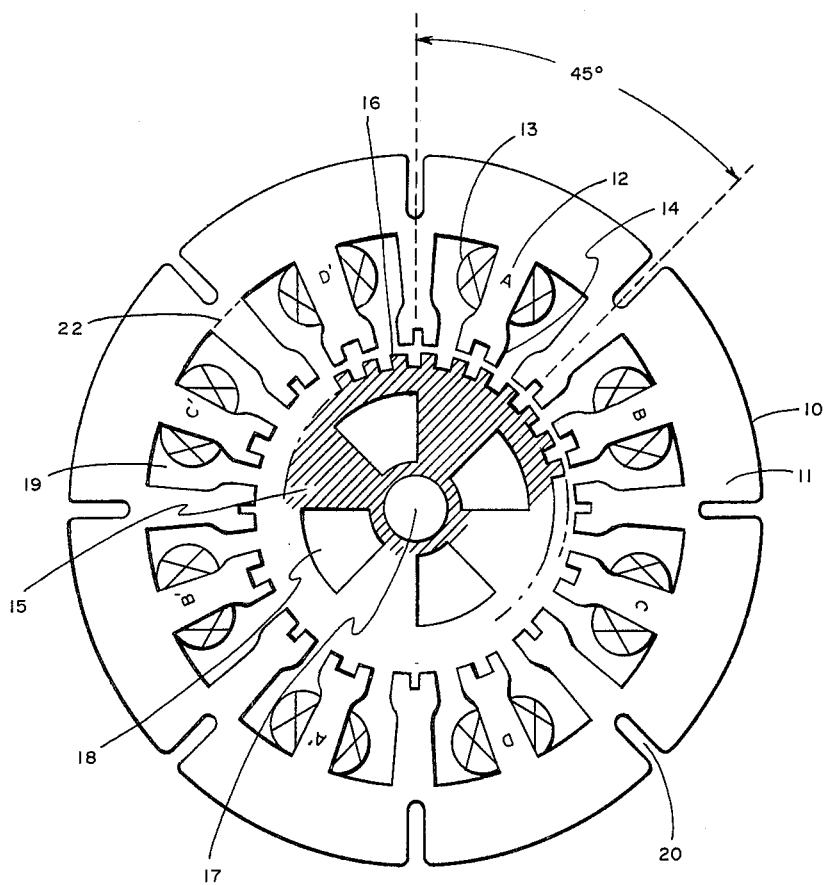
FIG. 1 is a view of a three degree, four phase embodiment of the variable reluctance stepper motor of the present invention.

Referring now to FIG. 1, integral pole member structure 10 which serves as a stator has a ring 11 and sixteen salient pole members 12. Imaginary dotted line 22 indicates where ring 11 ends and where pole members 12 begin. Eight alternate pole members have a winding 13 disposed on them. The remaining eight pole members have no windings. In addition, each of the pole members have teeth 14. A rotor 15 with teeth 16 serves as a variable reluctance member. Teeth 14 are circumferentially positioned with respect to teeth 16. Rotor 15 rotates in a step fashion around axis 17 and coacts with structure 10 when windings 13 are sequentially energized. In the three degree, four phase embodiment of FIG. 1, the winding pole members are grouped into four phases (A, B, C and D) each containing two winding pole members (e.g., A and A'), spaced 180° from one another. The winding pole members of each phase are separated from one another by a winding pole member of each of the other three phases. The energization sequence of the windings is predetermined. Windings 13 are intermittently excited such that the windings around pole members of the same phase (e.g., A and A') are excited simultaneously. Windings 3 are also wound in such a way that adjacent windings have opposite polarities upon energization. The fundamentals of operating a stepper motor are described in U.S. Pat. No. 3,984,711 and are incorporated here by reference.

Teeth 14 in non-winding pole members 12 and 6° wide with a 3° gap between each tooth. The relationship between teeth 14 and teeth 16 is such that teeth 14 associated with the two winding pole members of the same phase (e.g., A and A') as well as teeth 14 associated with the halves of the adjacent non-winding pole members closest to these winding pole members can be aligned with teeth 16. Teeth 14 associated with the halves of the adjacent non-winding pole members furthest from these winding pole members as well as teeth 14 associated with the other remaining pole members are offset from teeth 16.

In addition to teeth, rotor 15 also has a plurality of holes 18. The shape of holes 18 is defined by a short front arc opposite axis 17 and a larger back arc opposite pole members 12. The sides of holes 18 are lines which connect the front short arc and the larger back arc. The angle of these lines are such that an imaginary extension of the lines would disect the lateral center of pole members 12. The larger back arc is centered about a winding pole member and extends the 45° necessary to extend across not only a centered winding pole member but also one-half of each adjacent non-winding pole member.

A high magnetic impedance means 19 such as an air gap is provided to substantially isolate pole members 12 from one another. Inwardly projecting recesses 20 are also disposed around the periphery of structure 10 at 45° intervals. Recesses 20 serve the important function of further enhancing flux splitting and reducing flux coupling between adjacent winding pole members due to the location of recesses 20 in the lateral center of the non-winding pole members. The recesses are not deep enough into ring 17 to completely pierce imaginary dotted line 22 and make contact with pole members 12.

Figure 2:
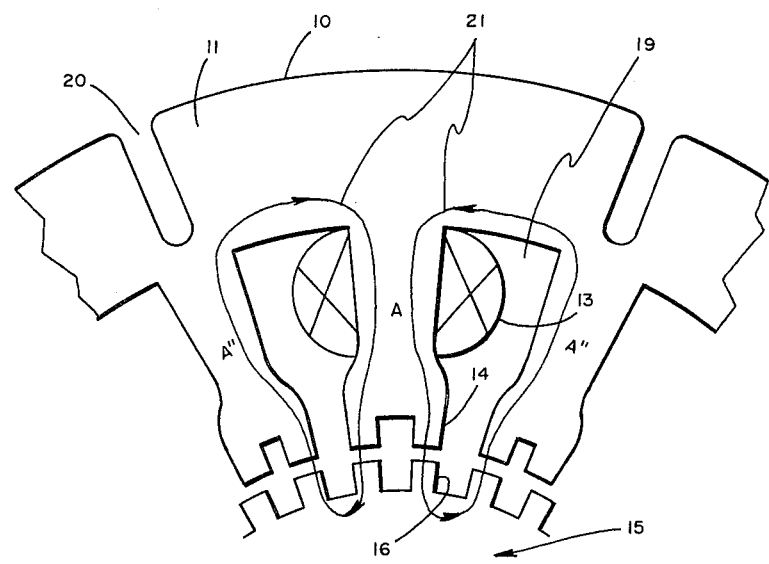
FIG. 2 is a view of the basic flux path and tooth relationship in the variable reluctance stepper motor of the present invention in a single phase equilibrium position.

Referring now to FIG. 2, flux path 21 has two parts, each of which pass through ring 11, half of a pole member 12, one of teeth 14, two of teeth 16, a single tooth of an adjacent non-winding pole member, and half of the adjacent non-winding pole member itself. The flux created by the energization of windings 13 is thus evenly divided and confined to short thin flux path 21. Recesses 20 serve to enhance flux splitting and reduce flux coupling between adjacent winding pole members.

Whereas we have illustrated and described the preferred embodiments of our invention, it is to be understood that we do not limit ourselves to the precise constructions herein disclosed and the right is reserved to all changes and modifications coming within the scope of the invention as defined in the appended claims.

We claim:

1. A variable reluctance stepper motor comprising:
   an integral pole member structure having a ring and a plurality of aligned salient pole members, each of said pole members having a pole face and a first plurality of teeth on said pole face;
   a plurality of windings disposed on alternate ones of said pole members;
   a means for energizing said windings;
   a high magnetic impedance means for substantially isolating said pole members from one another;
   a plurality of inwardly projecting recesses disposed around the periphery of said structure such that each of said recesses are located in the lateral center of a non-winding pole member;
   said recesses not being deep enough to completely pierce said ring and make contact with the non-winding pole members; and
   a variable reluctance member having a second plurality of teeth; said variable reluctance member coacting with said pole members;
   whereby the magnetic flux paths created by the energization of said windings are confined in such a manner as to reduce flux diversion and increase the torque of said motor when said windings are energized by a current of a given magnitude.

2. A motor according to claim 1 wherein said impedance means are air gaps.

3. A motor according to claim 1 wherein said motor is of the rotary type.

4. A motor according to claim 1 wherein said structure is stationary and said variable reluctance member is movable.

5. A motor according to claim 1 wherein said variable reluctance means further includes a plurality of aligned holes.

6. A motor according to claim 1 wherein said variable reluctance member is a rotor.

7. A motor according to claim 1 wherein said first plurality of teeth are circumferentially positioned with respect to said second plurality of teeth.

8. A motor according to claim 7 wherein at least one of said first plurality of teeth is offset from at least one of said second plurality of teeth.

9. A motor according to claim 7 wherein at least two of said first plurality of teeth are aligned with at least two of said second plurality of teeth.

* * * * *